(12) United States Patent
Nguyen

(10) Patent No.: US 7,962,608 B2
(45) Date of Patent: Jun. 14, 2011

(54) MONITORING SYSTEMS AND METHODS THAT INCORPORATE INSTANT MESSAGING

(75) Inventor: Phong T. Nguyen, Garland, TX (US)

(73) Assignee: Honeywell International Inc., Morristown, NJ (US)

( * ) Notice: Subject to any disclaimer, the term of this patent is extended or adjusted under 35 U.S.C. 154(b) by 426 days.

(21) Appl. No.: 11/555,710

(22) Filed: Nov. 2, 2006

(65) Prior Publication Data
US 2008/0106423 A1 May 8, 2008

(51) Int. Cl.
*G06F 15/173* (2006.01)
(52) U.S. Cl. ............. 709/224; 709/206; 340/286.05
(58) Field of Classification Search .......... 709/223–226; 455/403–405
See application file for complete search history.

(56) References Cited

U.S. PATENT DOCUMENTS

| 4,774,658 | A | * | 9/1988 | Lewin ................. 340/825.49 |
| 5,309,145 | A | | 5/1994 | Branch et al. |
| 5,638,448 | A | | 6/1997 | Nguyen |
| 5,651,070 | A | | 7/1997 | Blunt |
| 5,797,852 | A | | 8/1998 | Karakasoglu |
| 5,892,690 | A | | 4/1999 | Boatman |
| 5,917,405 | A | | 6/1999 | Joao |
| 5,974,141 | A | | 10/1999 | Saito |
| 6,023,223 | A | | 2/2000 | Baxter, Jr. |
| 6,040,770 | A | * | 3/2000 | Britton ................. 340/539.24 |
| 6,060,994 | A | | 5/2000 | Chen |
| 6,215,404 | B1 | | 4/2001 | Morales |
| 6,434,531 | B1 | | 8/2002 | Lancelot |
| 7,409,428 | B1 | * | 8/2008 | Brabec et al. ............ 709/206 |
| 2004/0078568 | A1 | * | 4/2004 | Pham et al. ............ 713/165 |
| 2005/0097440 | A1 | * | 5/2005 | Lusk et al. ............. 715/500.1 |

FOREIGN PATENT DOCUMENTS

| WO | WO 01/11586 A1 | 2/2001 |
| WO | WO 0111586 A1 * | 2/2001 |
| WO | WO 2006/012460 | 2/2006 |
| WO | WO 2007045257 A1 * | 4/2007 |

OTHER PUBLICATIONS

The Cisco Three-Layered Hierarchical Model By http://web.archive.org/web/20040618020226/http://www.semsim.com/ © 2004.*
European Patent Office European Search Report, Jul. 24, 2008, corresponding to European Patent Application No. 07254318.4.

* cited by examiner

*Primary Examiner* — Ian N Moore
*Assistant Examiner* — Jackie Zuniga
(74) *Attorney, Agent, or Firm* — Husch Blackwell

(57) ABSTRACT

An automatic Instant Messaging system adds remote access capability to fire alarm systems. Both public and private communications paths can be provided to enable displaced individuals to communicate with one or more alarm systems.

9 Claims, 6 Drawing Sheets

MONITORING SYSTEMS AND METHODS THAT INCORPORATE INSTANT MESSAGING

FIELD

This invention pertains to remote access communications system. More particularly, the invention pertains to such systems which enable remote operators to access monitoring systems such as fire alarm systems.

BACKGROUND

Currently, in known fire alarm systems it is necessary to have an operator monitor a fire panel or a monitoring workstation during fire alarm system walk-test, commissioning, inspection, and servicing. The operator relays fire alarm events to field technicians. If the field technicians want to acknowledge events or send commands to the fire network. Usually this can only be done by relaying the commands to the operator at the panel or the monitoring workstation. Relaying messages can cause confusion and add additional time to the whole process.

Additionally, there is no easy way for remote service technicians to view the status of the fire alarm system upon receiving a service call. Moreover, once at the site, the technicians still have to coordinate with an operator to assist in relaying system messages and issuing commands to the fire alarm system.

There is thus a continuing need for low cost and easy to use systems that can eliminate the need for an operator to monitor a fire panel or a monitoring workstation. Also, it would be preferable if such systems are compatible with existing infrastructure.

DETAILED DESCRIPTION

Figure 1:
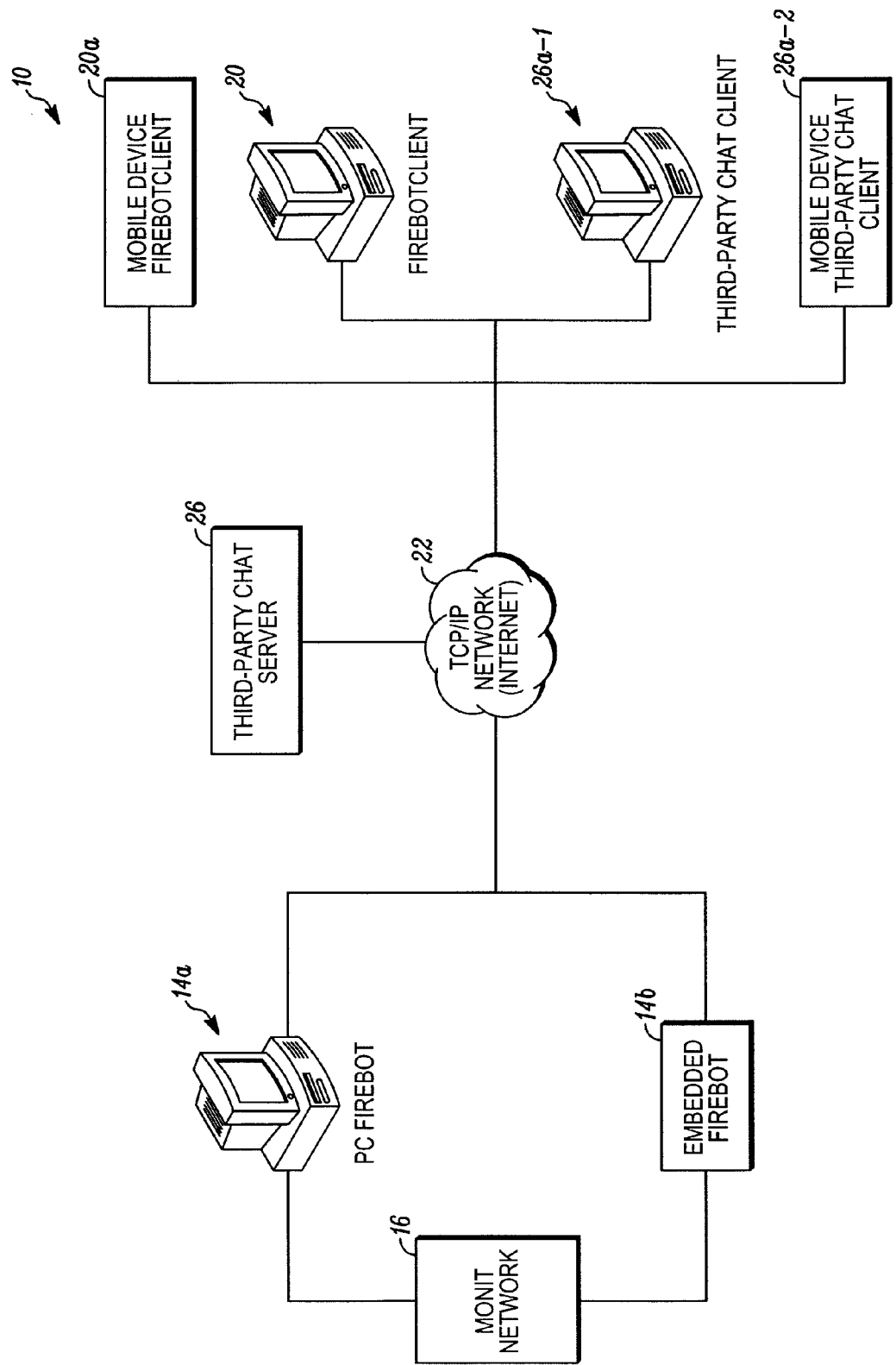
FIG. 1 is an overview block diagram of a system which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

FIG. 1 is a block diagram of a system 10 which embodies the invention. System 10 could include at least one of FireBot software which can be executed on a personal computer (PC) 14a or embedded, FireBot software 14b running concurrently in one system. Both PC 14a and embedded FireBot 14b have similar functionality.

Figure 2:
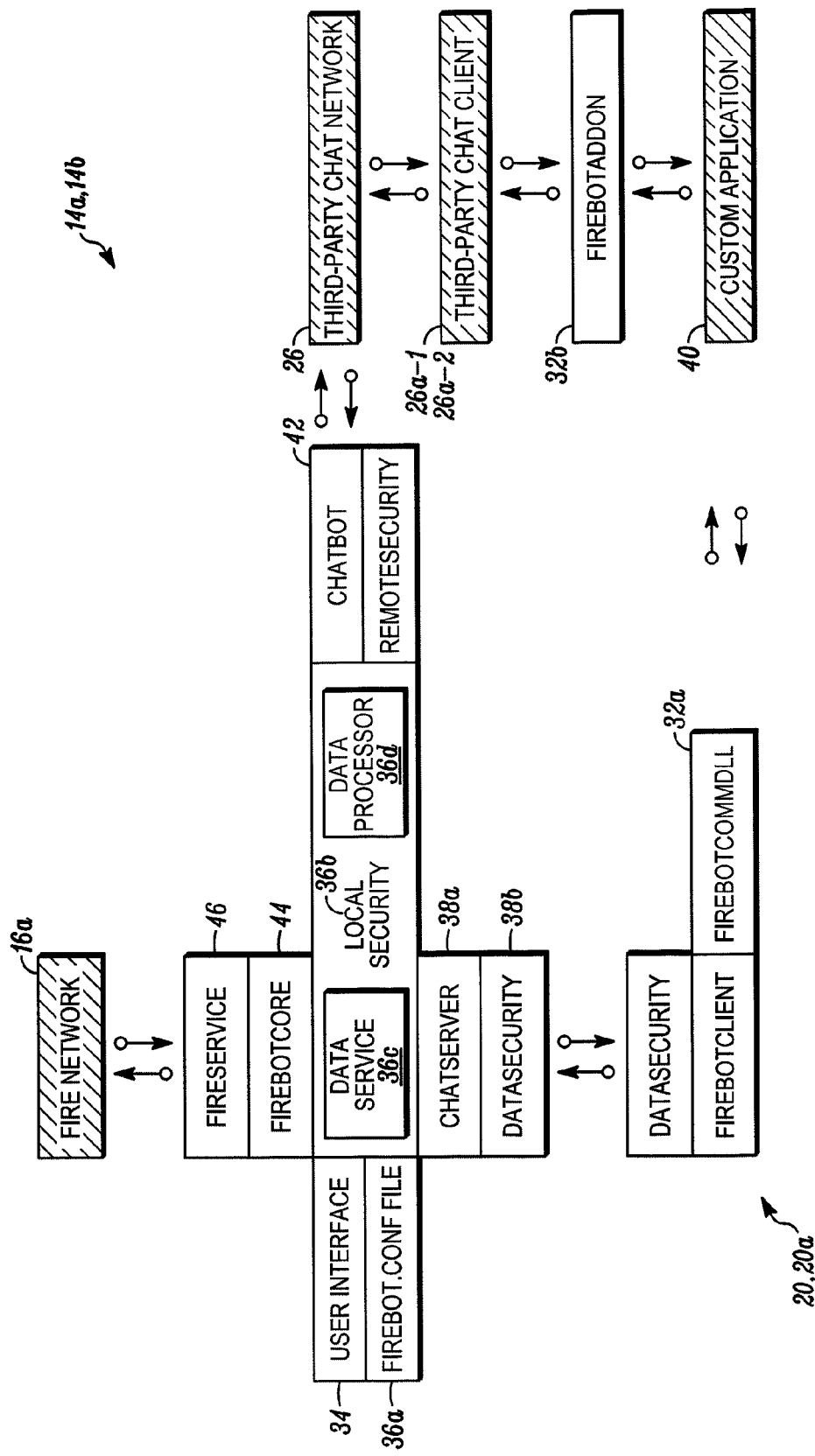
FIG. 2 is a diagram that illustrates additional details of the system of FIG. 1.

The selected embodiment is in communication with a regional monitoring system 16, for example, a fire monitoring system such as 16a, see FIG. 2. Each incorporates an instant message (IM) server which supports secure encrypted connection with a proprietary client 20 (referred to as FireBot-Client in FIG. 1) or a wireless terminal 200a via a computer network 22 such as the Internet.

There are three communications paths in system 10: one path is between the FireBot software 14a or 14b and the monitoring Network 16. A public path exists between FireBot software 14a, or 14b and a third-party chat network supported by a server 26. A third path exists between FireBot software 14a or 14b and the FireBotClient 20,20a. Due to third-party constraints and security issues, the public path only supports user name/password authentication and will not allow administrative rights remotely. The private path provides a secure connection between FireBot software 14a or 14b and its proprietary clients, 20, 20a. Beside basic user name/password authentication, all data transmitting across the private connection will be encrypted to provide system administrators full administrative rights remotely.

FIG. 2 is a block diagram of the architecture of FireBot software 14a or 14b. Each block represents a detachable and replaceable module. This allows maximum portability, expandability, and adaptability to multiple Fire Networks and third-party IM networks. FireBot software 14a or 14b also provides two public components—FireBotCommDLL 32a and FireBotAddon 32b. These two components enable custom applications to communicate with the FireBot software, 14a or 14b.

In one embodiment each block in FIG. 2 is only visible to and communicates with the adjacent block(s).

The User Interface (UI) module 34 enables local administrators to access and modify FireBot software's data and settings. The user interface unit 34 can access firebot.conf file 36a and LocalSecurity 36b. LocalSecurity 36b provides encryption and decryption services to the user interface 34 during saving and retrieving secured data such as passwords.

LocalSecurity DataService 36c is responsible for data access to the firebot.conf file 36a. During normal operation module 36c maintains the active settings and security policies in memory and updates the firebot.conf file 36a. LocalSecurity 36b uses module 36c to verify requests and commands from both public and private connections. Invalid data will be dropped. The module 36c also maintains a FireMsgQueue which stores a list of current monitoring system messages.

LocalSecurity DataProcessor (36d) is a data routing service responsible for processing incoming data and forming outgoing data sequences.

FireBot ChatServer 38a hosts the private instant message network for all FireBotClients such as 20, 20a. Its main responsibilities are to establish and maintain client connections. The ChatServer 38a uses module 36c to verify and update verification on all connections. All verified connections will have a direct path to processor 36d.

DataSecurity 38b is responsible for data encryption and decryption across the private network.

The FireBotClient comes in two versions—PC version 20 and mobile device 20a. Both versions provide an interface for operators to communicate with the FireBot software 14a,b. Both versions also come with a set of public components FireBotCommDLL 32a to enable external applications to interact with or automate the FireBotClient 20, 20a.

An external application 40 can also use FireBotAddon 32b to interface with the FireBot software 14a,b. FireBotAddon 32b is an add-on application for third-party chat clients. FireBotAddon 32b provides similar public components as FireBotCommDLL 32a. Thus, applications developed for system 10 can work with both types of connection.

ChatBot 42 is an automatic instant message client responsible for connecting to third-party instant message network(s) and communicating with third-party clients 26a-1,-2.

FireBotCore 44 is a central processing unit which process commands and commands' instructions from clients and processes data from FireService 46. In one embodiment, FireBotCore 44 will not check for security and will process and return values to all requests. All processed data from FireService 46 will be sent to module 36c. Module 36c checks for security and determines which client(s) to send the data to.

FireService 46 is responsible for establishing and maintaining communications with the monitoring network 16. FireService 46 issues commands sent from FireBotCore 44, and checks and updates FireBotCore 44 in connection with new event(s) in the monitoring network 16.

Figure 3:
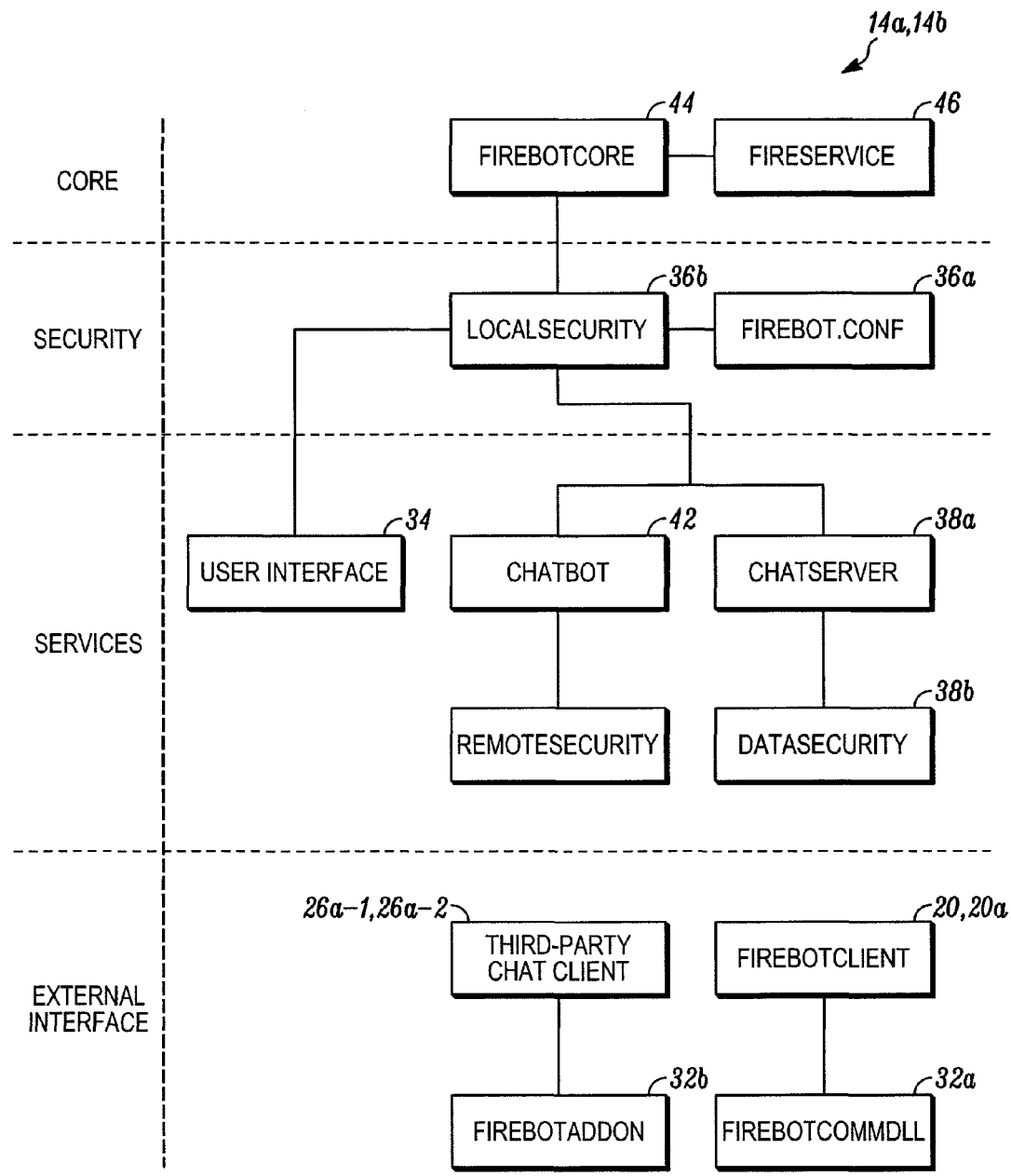
FIG. 3 is a diagram that illustrates various aspects of a software embodiment in accordance with the system of FIG. 1.

FIG. 3 illustrates the four layers of the FireBot software 14a,b. This structure restricts external interface services like ChatBot 42, ChatServer 38a, and the User Interface 34 from accessing the core services. Processor 36d acts as a data routing service passing data between the two layers.

Figure 4:
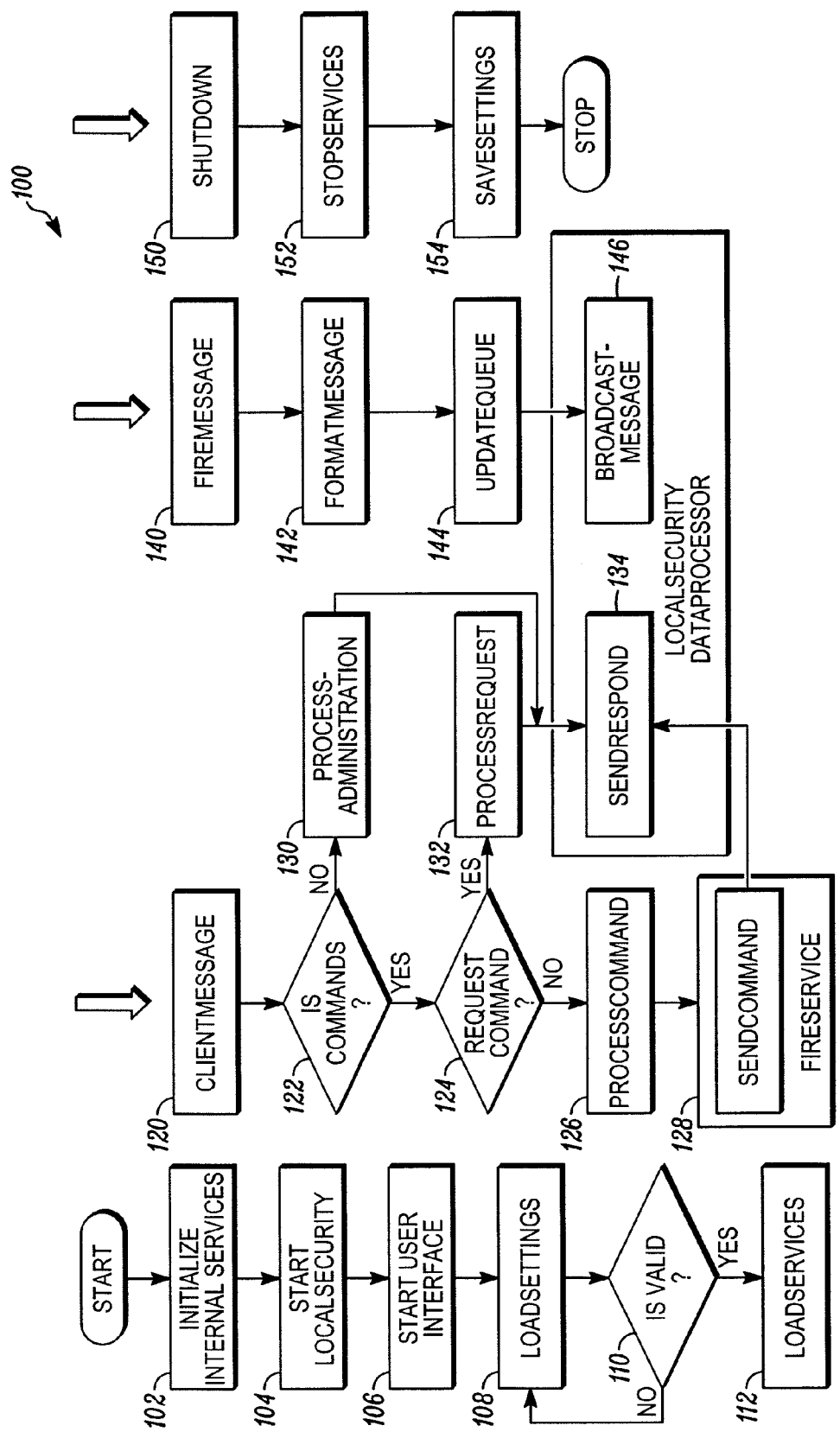
FIG. 4 is a diagram illustrating aspects of a process in accordance with the invention.

FIG. 4 is a flow diagram of an operational sequence 100 of the FireBot software 14a or 14b. It will be understood that the above described modules noted in FIG. 3 could be implemented by a variety of software and hardware combinations without limitation. Software modules can be implemented via different programming languages and executed on different programmable processors all without limitation.

At the start of process 100, internet services are initialized, 102. Local security module 36b is activated 104. A user interface 34 is activated 106. System settings are loaded 108. A decision is made, 110 as to whether the settings are valid. If so services are loaded 112.

When client message arrives, 120 a decision must be made as to whether incoming message is administrative, or command, 122. Administrative messages perform administrative functions. Only messages from the user Interface 34 and the private connection can send this type of message. Such messages can be passed to the process administration to get data from or modify firebot.conf file. Command messages can request status of the monitoring system 16 or send commands thereto. If non-administrative, a second decision must be made, 124 as to whether it is a request or a command. If a command it is then formatted, 26 and forwarded 128 to the fire service module 46.

In the event that it is administrative, administrative processing can be carried out 130. If a request, the request can be processed 132. Then a response can be sent 134.

Where a fire message has been received 140, a message can be formatted 142. A message queue can be updated 144 and the message broadcast 146 to appropriate clients.

Where the system is to be shut down 150, services can be terminated 152 and settings can be saved 154 for future use.

Figure 5:
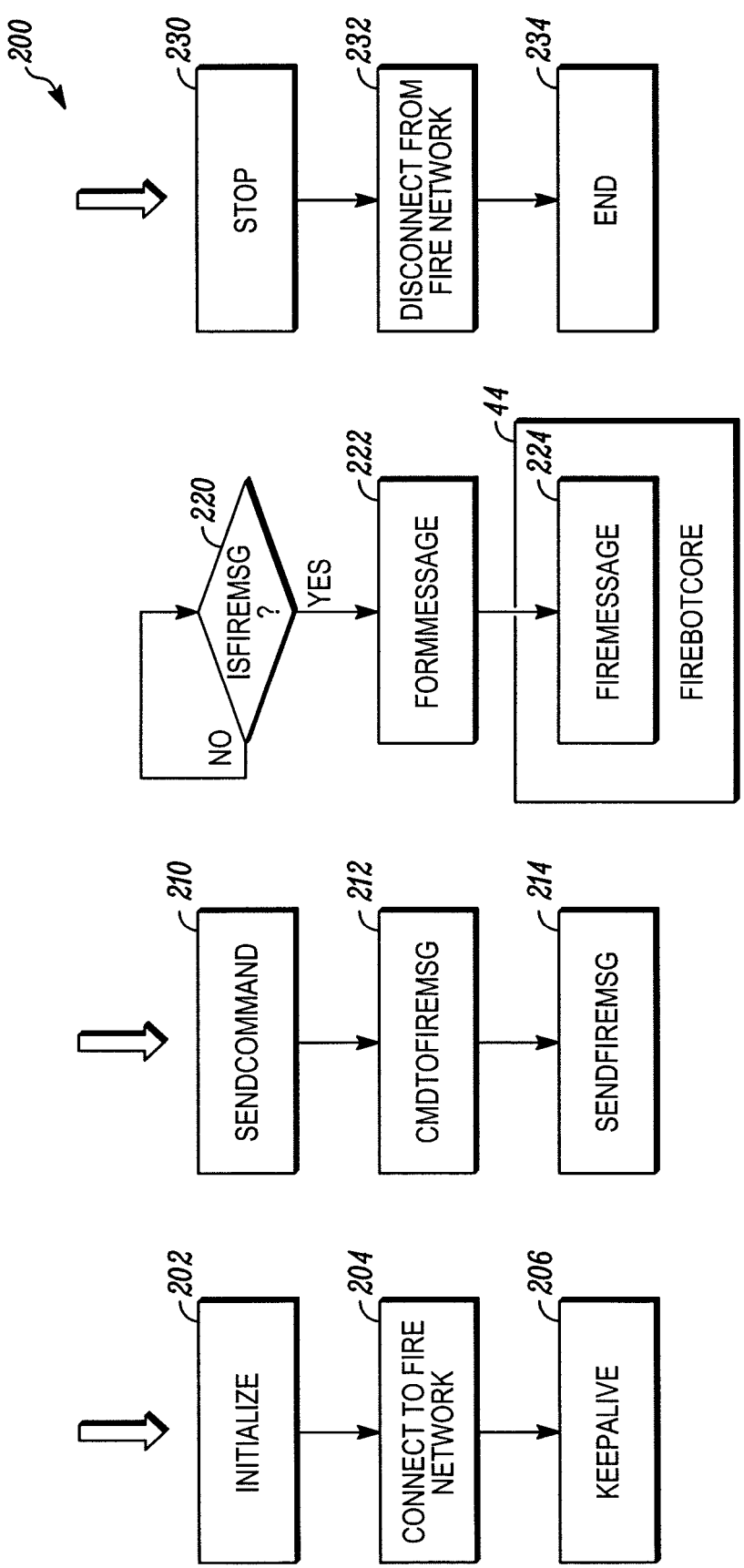
FIG. 5 is a diagram illustrating aspects of fire service processing in accordance with the invention.

FIG. 5 illustrates a process 200 of communicating with network 16.

In an initialization branch 202, the Fire Service module 46 connects 204 to the monitoring network 16. Subsequently the communication path is maintained, 206, for use.

Commands can be sent 210 to fire service module 46 from the FireBot Core module 44. The fire service module 46 translates all commands into a fire message format 212 and then sends them 214 to the monitoring, or fire, network 16.

The fire service module 46 continuously checks, 220, for a message from the monitoring network 16. Such messages when received are formatted 222 and transmitted 224 to the Firebot core module 44.

In response to system termination 230 the fire service module 46 disconnects 232 from the monitoring network 16 and processing terminates 234.

Figure 6:
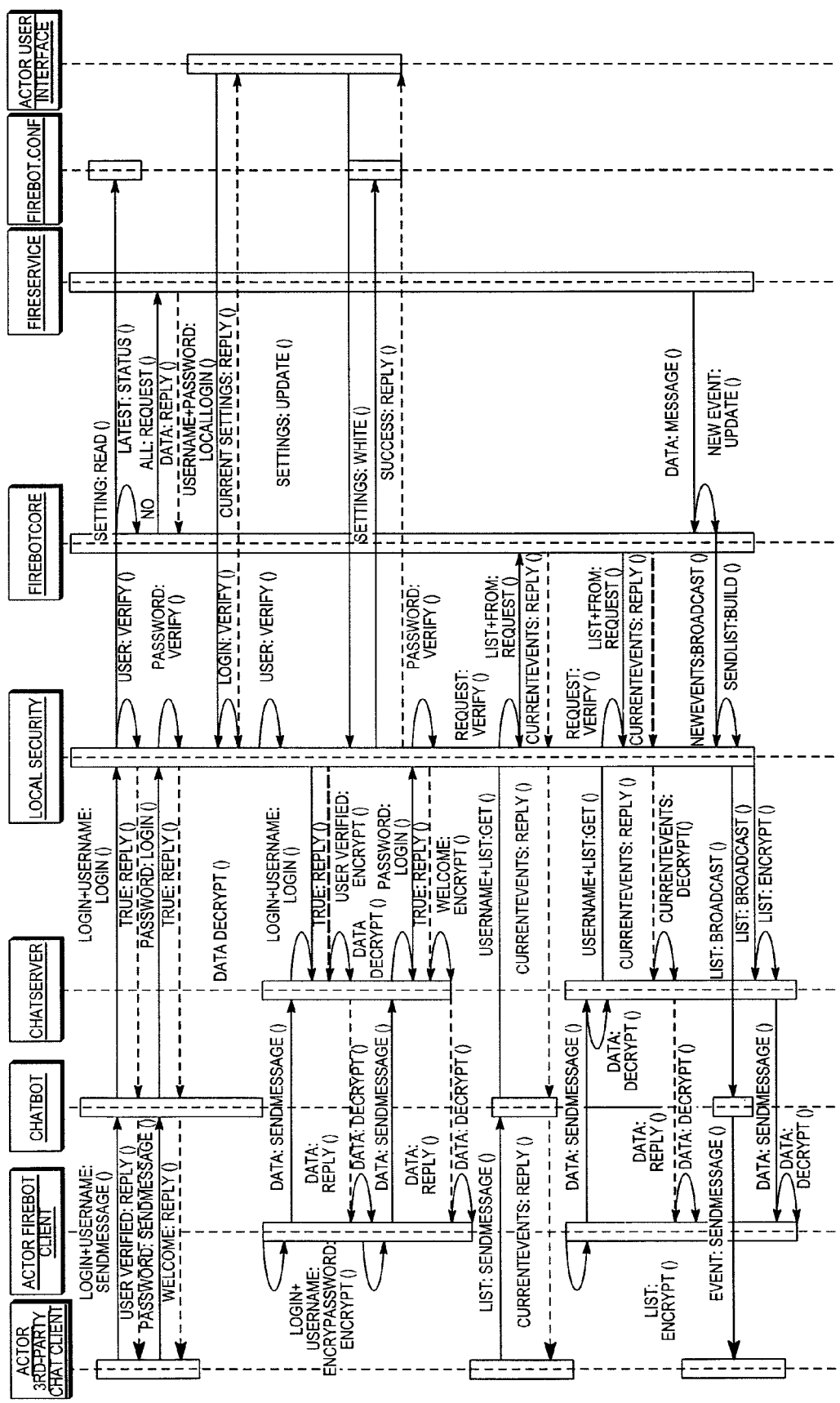
FIG. 6 is a sequence diagram illustrating private and public instant messaging in accordance with the invention.

FIG. 6 illustrates additional aspects of FireBotClient 20,20a and Third-Party Chat Client 26a-1,-2 communication. On the left are external actors (users) making connections and sending requests to FireBot. On the right is local user interface login and update of users' settings. The last session is when a new message occurs in the fire network. As those of skill in the art understand FIG. 6 is self-documenting and need not be described further.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
a system including at least a fire monitoring system for monitoring ambient conditions in a region;
a computer coupled to the monitoring system and software executed by the computer, the software comprising a plurality of modules organized in a plurality of layers where each module of the plurality of modules is only visible to and communicates with an adjacent module directly below the module in that the modules have the ability to access and use directories of only those adjacent software modules with said adjacent relationship defined by a core layer fire service module that communicates with the monitoring system, a security layer module which communicates with the core layer module and a local user interface module that broadcasts fire messages from the fire monitoring system to an authenticated user where the security layer module also communicates between a configuration file and the user interface module, where the security layer module restricts the user interface module from accessing the core layer fire service module and where the security module receives a client message from the authenticated user and decides that the client message is one of an administrative message and a command message, the administrative message retrieving data or modifying the configuration file, the command message forwarded to the core layer fire module;
a network coupled to the computer the network supports real-time messaging; and
software executable by another processor that enables the authenticated user to send the client message and to request and to obtain condition related information including at least the broadcast fire message from the system via the network.

2. An apparatus as in claim 1 where the network comprises one of a local area network or a plurality of interconnected computer networks.

3. An apparatus as in claim 1 which includes private instant messaging circuitry and public instant messaging circuitry.

4. An apparatus as in claim 1 where the user interface module can receive administrative messages.

5. An apparatus as in claim 4 which includes executable software to verify at least one of requests or commands from at least one class of user.

6. An apparatus as in claim 3 which includes executable software to verify at least one of requests or commands from at least one class of user.

7. An apparatus as in claim 6 which includes an instant message server for private messages.

8. An apparatus as in claim 6 which includes a public interface that communicates with public user service applications.

9. An apparatus as in claim 8 which includes private user software that evaluates commands entered by a user.

* * * * *